United States Patent Office 2,971,038
Patented Feb. 7, 1961

---

2,971,038

METHOD COMPRISING SULFUR VULCANIZING A RUBBER IN THE PRESENCE OF A THIAZOLE-SULFENAMIDE OF A 1,8-DIAMINOMENTHANE

John J. D'Amico, Charleston, W. Va., assignor to Monsanto Chemical Company, St. Louis, Mo., a corporation of Delaware No Drawing. Filed Dec. 27, 1955, Ser. No. 555,300

5 Claims. (Cl. 260—788)

The present invention relates to derivatives of p-methyl isopropyl cyclohexane, more generally known or identified as p-menthane, and specifically relates to thiazolesulfenamide derivatives thereof. Such products, as are shown by the examples that follow, are readily produced by the controlled oxidation of a mixture of a diamino menthane and a thiazole. The new chemical products possess the property and function of accelerating the vulcanization of rubber and of producing a rubber vulcanizate of satisfactory commercial quality while delaying the scorch tendency of tire tread stocks containing the newer types of carbon black. The invention will be apparent and understood from the examples that follow.

EXAMPLE 1

A solution was prepared comprising 29.2 parts (0.169 mole) of 2-mercaptobenzothiazole of 97% purity, in 340 parts of water containing 54.2 parts (0.338 mole) of 25% caustic soda solution and 144 parts (0.845 mole) of 1,8-diaminomenthane. This solution was continuously and vigorously agitated while slowly adding over a period of about 90 minutes a solution containing 43.3 parts of iodine dissolved in 575 parts of water containing 46.7 parts of potassium iodide. During the addition of the oxidizing agent the temperature of the mixture was held between 25–30° C. After the mixture was completed, agitation was continued for about another hour, whereupon the mixture was cooled to about 10° C. and the solid product removed by filtration means. The product was washed with water until the wash waters were neutral to litmus and the yellow colored solid product was air dried at room temperature. The N,1-(8-aminomenthyl)-2-benzothiazolesulfenamide so obtained melted at 79–80° C. and analyzed 19.06% sulfur as compared to 19.11% calculated for $C_{17}H_{25}N_3S_2$. The product has the following structural formula:

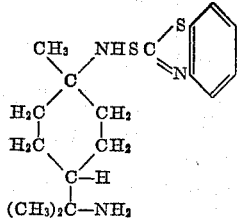

EXAMPLE 2

As another example of the invention, N,1-(8-aminomenthyl)-5-chloro-2-benzothiazolesulfenamide was prepared, which product has the following structural formula:

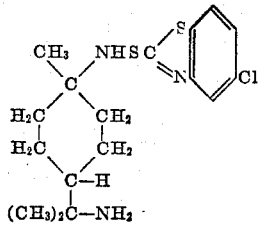

Following the procedure described in detail in Example 1, a solution of 43.3 parts of iodine dissolved in 575 parts of water containing 46.7 parts of potassium iodide was slowly added as before to a solution formed by dissolving 33.2 parts (0.17 mole) of 5-chloro-2-mercaptobenzothiazole in 340 parts of water containing 54.4 parts (0.34 mole) of 25% caustic soda and 170.3 parts (1.0 mole) of 1,8-diaminomenthane. The cream colored solid melted at 65–67° C. and on analysis was found to contain 17.36% sulfur and 9.54% chlorine as compared to 17.33% sulfur and 9.58% chlorine calculated for $$C_{17}H_{24}ClN_3S_2$$

EXAMPLE 3

Again following the procedure described in detail in Example 1, a solution of 32.2 parts (0.17 mole) of methyl-2-mercapto-4-methyl-5-thiazolecarboxylate in 100 parts of water containing 54.4 parts (0.34 mole) of 25% caustic soda solution and 170.3 parts (1.0 mole) of 1,8-diaminomenthane was treated with a solution of 43.3 parts iodine dissolved in 575 parts of water containing 46.7 parts of potassium iodide. The resulting N,1-(8-aminomenthyl)-5-carbomethoxy-4-methyl-2-thiazolesulfenamide, a tan colored solid, melted at 60–62° C. Analysis gave 17.23% sulfur as compared to 17.93% calculated for $C_{16}H_{27}N_3O_2S_2$. The product has the following structural formula:

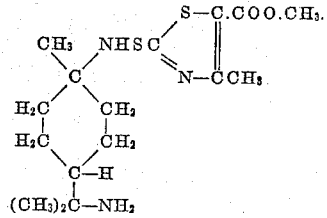

The products hereinbefore shown which are typical examples of the present invention were tested to determine their effectiveness as rubber vulcanization accelerators in the following tire tread stock:

| Stock | A | B | C |
|---|---|---|---|
| | Parts by weight | | |
| Smoked sheets rubber | 100 | 100 | 100 |
| Carbon black | 50 | 50 | 50 |
| Zinc oxide | 5 | 5 | 5 |
| Stearic acid | 2 | 2 | 2 |
| Saturated hydrocarbon softener | 3 | 3 | 3 |
| Sulfur | 2.5 | 2.5 | 2.5 |
| N,1-(8-Aminomenthyl)-2-benzothiazolesulfenamide | 0.8 | | |
| N,1-(8-Aminomenthyl)-5-chloro-2-benzothiazolesulfenamide | | 0.8 | 0.5 |
| N,N'-Dinitroso-N-diphenyl-p-phenylenediamine | | | 1.5 |

The stocks were cured in the usual manner by heating in a press for various periods of time at 144° C. The physical properties of the vulcanizates are set forth below:

Table I

| Stock | Cure Time in Mins. | Modulus of Elasticity in lbs./in.² at Elongation of 300% | Tensile at Break in lbs./in.² | Ultimate Elongation, Percent |
|---|---|---|---|---|
| A | 30 | 2,296 | 3,463 | 416 |
| B | 30 | 2,410 | 3,743 | 440 |
| C | 30 | 2,050 | 3,840 | ---- |
| A | 60 | 2,250 | 3,540 | 420 |
| B | 60 | 2,390 | 3,450 | 410 |
| C | 60 | 2,070 | 3,600 | ---- |
| A | 90 | 2,310 | 3,273 | 400 |
| B | 90 | 2,063 | 3,343 | 436 |
| C | 90 | ---- | ---- | ---- |

The resistance of the stocks to prevulcanization (scorch) was evaluated by means of a Mooney plastometer. The time required for incipient vulcanization or scorch was taken at the point on the plasticity curve when the plasticity began to rise continuously and reached an arbitrary value of 10 unit points above the minimum value.

Table II

| Stock | Mooney Scorch in Mins. at 121° C. |
|---|---|
| A | 17 |
| B | 20 |
| C | 47 |

It is evident that the sulfenamide derivatives of p-menthane exhibit excellent rubber vulcanizing properties and also possess outstanding anti-scorch properties which property is augmented by the presence of a nitroso secondary amine. It is apparent that a wide variety of thiazoles can be reacted by the procedure herein set forth with a diaminomenthane to produce new products of the type disclosed herein.

It is intended to cover all changes and modifications of the examples of the invention herein chosen for purposes of disclosure which do not constitute departures from the spirit and scope of the invention.

What is claimed is:

1. The method of vulcanizing rubber which comprises heating a rubber and sulfur in the presence of a small amount sufficient to accelerate vulcanization of a thiazolesulfenamide of a 1,8-diaminomenthane wherein the radicals which satisfy the valences of the vicinal carbon atoms of the thiazole ring are selected from the group consisting of radicals which with the said vicinal carbon atoms complete a six membered aromatic ring, lower alkyl and lower carboalkoxy radicals, not more than one radical being selected from one member of the aforesaid group.

2. The method of vulcanizing rubber which comprises heating a rubber and sulfur in the presence of a small amount sufficient to accelerate vulcanization of a benzothiazolesulfenamide of a 1,8-diaminomenthane.

3. The method of vulcanizing rubber which comprises heating a rubber and sulfur in the presence of a vulcanization accelerating amount of N,1-(8-aminomenthyl)-5-chloro-2-benzothiazolesulfenamide.

4. The method of vulcanizing rubber which comprises heating a rubber and sulfur in the presence of a vulcanization accelerating amount of N,1-(8-aminomenthyl)-2-benzothiazolesulfenamide.

5. The method of vulcanizing rubber which comprises heating a rubber and sulfur in the presence of a vulcanization accelerating amount of N,1-(8-aminomenthyl)-5-carbomethoxy-4-methyl-2-thiazolesulfenamide.

References Cited in the file of this patent

UNITED STATES PATENTS

| | | |
|---|---|---|
| 2,024,605 | Sebrell | Dec. 17, 1935 |
| 2,339,552 | Carr | Jan. 18, 1944 |
| 2,419,294 | Skaptason | Apr. 22, 1947 |
| 2,581,936 | Carr | July 2, 1949 |
| 2,582,128 | Hurwitz | Jan. 8, 1952 |
| 2,772,278 | Hardman | Nov. 27, 1956 |

OTHER REFERENCES

Creed et al. (I. & E. Chem.), volume 46, #4, pages 808–816.